Figure 1:
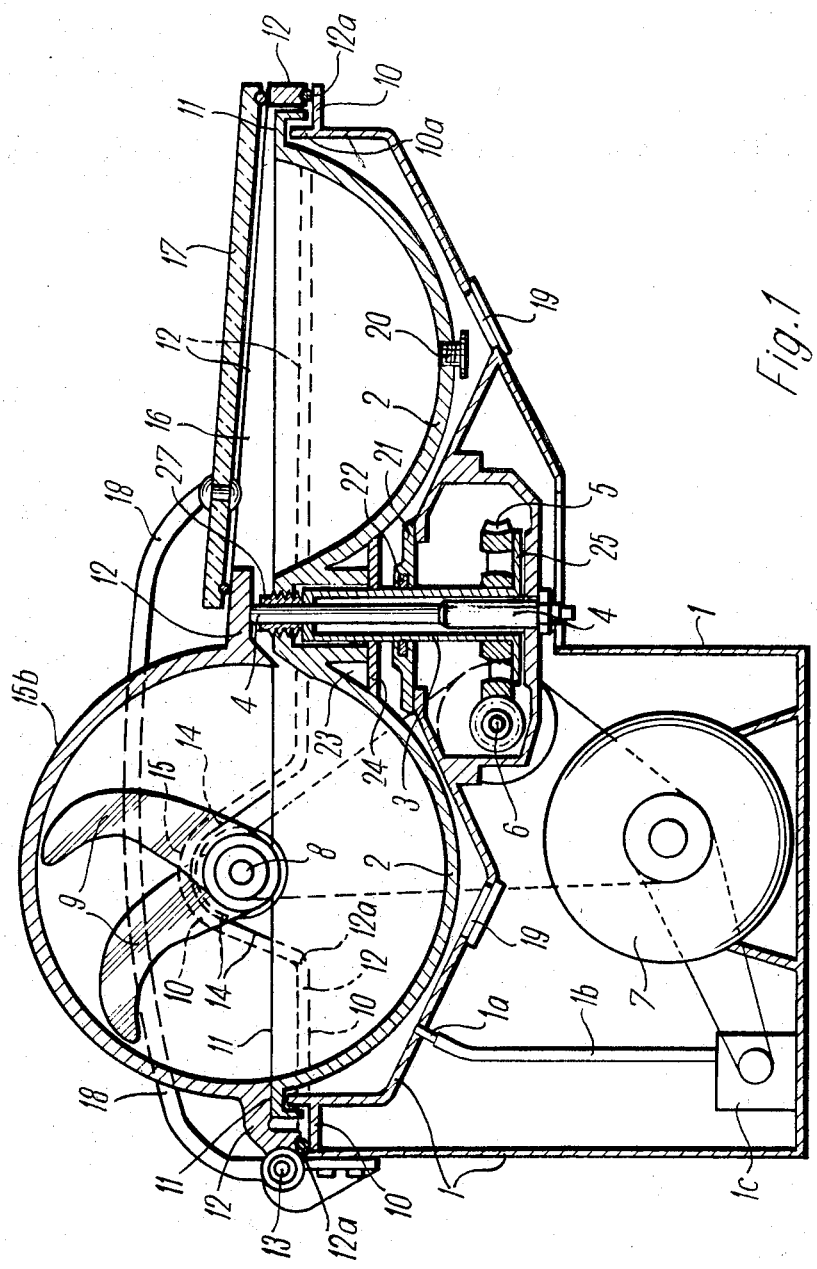

United States Patent [19]

Seydelmann

[11] 3,764,081

[45] Oct. 9, 1973

[54] VACUUM CUTTER

[76] Inventor: Horst Seydelmann, Verl. Schulstrasse 50, Aalen, 7080 Germany

[22] Filed: July 3, 1972

[21] Appl. No.: 268,776

[30] Foreign Application Priority Data

Nov. 9, 1971 Germany.................. P 21 55 647.8

[52] U.S. Cl............... 241/199.7, 241/37.5, 241/97, 241/DIG. 14, 241/DIG. 33
[51] Int. Cl. ...................... B02c 18/14, B02c 18/16
[58] Field of Search..................... 241/37.5, 97, 167, 241/199, 199.1, 199.5, 199.6, 199.7, DIG. 14, DIG. 33

[56] References Cited
UNITED STATES PATENTS

| 1,583,755 | 5/1926 | Schmidt...................... 241/199.7 X |
| 2,934,115 | 4/1960 | Grebe............................ 241/199.6 |
| 3,548,901 | 12/1970 | Schaller........................... 241/199.6 |

*Primary Examiner*—Willie G. Abercrombie
*Attorney*—Karl F. Ross

[57] ABSTRACT

A vacuum cutter, especially for meat, having a stationary lower housing part and an upper cover part pivotably connected to one end of the lower part, an annular pan rotatable within the lower housing part about a vertical axis and having an outer rim overlapping an upwardly projecting ridge on the upper rim of the lower housing part which extends substantially horizontally with the exception of a relatively narrow upward projection through which a horizontal cutter shaft extends from one side of the machine over said pan so that cutter blades mounted on the free end of the cutter shaft are rotatable within a vertical plane through and above one side of the pan, said cover being substantially flat except for a tunnel-like upward projection covering the cutter shaft when the cover is closed and then engaging upon the projection of the lower housing part, said tunnellike projection terminating into a further upwardly projecting hood for covering the blades. The parts of the housing in which the pan is located are designed so as to have a very small volume which may be easily evacuated.

11 Claims, 2 Drawing Figures

VACUUM CUTTER

The present invention relates to a vacuum cutter for cutting and/or mixing various materials and especially meat, which comprises a pan which is rotatable about its central vertical axis within a horizontal plane and adapted to receive the materials, at least one cutter shaft which extends substantially horizontally and at a right angle to the plane of the axis of the pan and the free end of which projecting over the pan carries one or more blades, a stationary lower housing part on which the pan and the cutter shaft are rotatably mounted, an upper housing part which is pivotably connected to the lower housing part and serves as a cover for opening and hermetically closing and covering the latter and the pan therein as well as the free end of the cutter shaft and the blades thereon, and a suction pump for evacuating the space between the two housing parts and in the pan within this housing.

By evacuating the space between the upper and lower housing parts as well as the pan and the materials therein, the advantage may be attained that the cutter blades which rotate at a high speed while cutting and/or mixing the materials within the pan will not contaminate the materials with air and the bacteria contained therein, and the air or gases which might already be contained within these materials when filled into the pan will also be substantially removed therefrom. Such evacuation considerably improves the keeping quality of the treated materials. This is especially important if these materials consist, for example, of meat which easily spoils when affected by bacteria.

In some of the known machines of this type it was necessary for passing the cutter shaft through the wall of the lower housing part to extend the latter vertically so as to project on all sides considerably above the rim of the pan. The joint between the upper and lower housing parts was then located, for example, within a plane which extends parallel to the rim of the pan and considerably above the latter. Consequently, when removing the material from the pan through a filling and discharge opening which is usually provided at a part of the machine remote from the position of the cutter shaft, the material had to be lifted out of the pan very carefully and over the projecting part of the lower housing part since parts of the material would otherwise drop between the rim of the pan and this projecting part and into the lower housing part from which it could be removed only with considerable difficulty. However, it often occurs that, while removing the material from the pan, the operator of such a machine does not even notice that small parts thereof have dropped into the gap between the rim of the pan and the projecting edge portion of the lower housing part. Either because of this fact or because of the difficulty involved in removing the spilled material from the lower housing part, this material remaied therein and eventually spoled to such an extent that, unless a very high vacuum was produced in the housing, the main purpose of the evacuation, namely, to prevent the contamination of the material in the pan by bacteria, was not sufficiently attained.

For reducing this disadvantage, it has also been proposed to design such a machine so that the joint between the upper and lower housing parts does not extend within a horizontal plane parallel to the rim of the pan, but within a plane which is inclined so that the point where the cutter shaft passes through the wall of the lower housing part will be located above the joint and thus also above the rim of the pan, while within the area in which the material is filled into and removed from the pan the joint between the two housing parts is located below the rim of the pan. A machine of this construction with such an inclined joint between the upper and lower housing parts requires, however, a considerable dead space above the pan which prevents the vacuum cutter from being quickly evacuated and also requires a very strong suction pump. It is a further disadvantage os such a machine that the rim of the rotating pan, for example, while the latter is being emptied, might draw parts of the cut material into the gap which is formed around the rim of the pan and between the latter and the surrounding part of the stationary lower housing. The removal of this easily spoilable material from the lower housing part and the cleaning of the latter was very difficult and the alleged advantages of this machine over that as previously described were far outweighed by its disadvantages.

For facilitating the removal of the cut material, it has also been proposed to design the machine so that the joint between the upper and lower housing parts is located within a plane below that of the rim of the pan. This required the cutter shaft to be mounted within the removable upper part of the housing which, of course, considerably increased the weight of the upper part and required considerable forces for lifting the latter so as to open the housing. Furthermore, the machines of this type of construction required rather complicated means for driving the cutter blades and sometimes even a separate motor for driving the pan and another for driving the cutter blades.

It is an object of the present invention to provide a vacuum cutter in which, even though the cutter shaft is rotatably mounted in the lower housing part, a "soiling slot" between the rim of the rotating pan and an edge portion of the lower housing part which projects above and outside of this rim will be avoided by designing the machine so that the sealing edge of the lower housing part will be located underneath the rim of the pan not only within the area in which the material to be treated is filled into the pan and the treated material is removed therefrom, but will also extend underneath this rim as far as possible about the entire pan. It is a further object of the invention to design the machine so as to have the smallest possible space within the housing which has to be evacuated so that the required vacuum may be produced as quickly as possible and by simple and inexpensive means.

For attaining these objects, the invention provides the sealing edge or sealing rim of the lower housing part to be located laterally underneath the rim of the pan with the sole exception of a small area of the upper end of the wall of the lower housing part through which the substantially horizontal cutter shaft extends from a lateral side through this wall so that the blades on the free end of this shaft will be rotatable within the pan. Within this small area of the wall of the lower housing part, this wall is provided with an upward projection through which the cutter shaft extends. The sealing rim of the upper housing part is then made of a shape complementary to that of the sealing rim of the lower housing part so that the part of this upper sealing rim over the cutter shaft has a tunnellike shape the end of which projects still further upwardly like a hood to provide underneath it the necessary space for the rotary blades on the free end of the cutter shaft. Because of the complementary shape of the two sealing rims between which a gasket is inserted, the upper housing part when pivoted downwardly may be tightly locked and hermetically sealed to the lower housing part.

With the exception of the tunnel-shaped part which extends from one side over the rim of the pan and terminates into the hood covering the cutter blades, the lower side of the upper housing part extends substantially horizontally and engages with the flat upper side of the rim of the pan which during its rotation is slidable thereon. Consequently, any parts of the material as well as any spices or other additions which might be thrown outwardly by the cutter blades which are driven at a high speed cannot pass out of the pan. Since with the exception of the tunnel-shaped part and the hood part covering the cutter blades the lower side of the upper housing may be flat and covers the pan directly, there is a very small dead space within the pan and the two housing parts which has to be evacuated.

In the attempt to reduce as much as possible the space within the machine which has to be evacuated, it is, however, necessary in view of the evacuation to provide suitable means for preventing the upper housing part from being pressed by the atmospheric pressure to such an extent upon the rim of the pan that the friction on the latter will be excessive and might even prevent its rotation. For eliminating this danger, the invention further provides an adustable bracing or spacing member substantially at the center of the lower housing part. This spacing member may preferably also serve as a normally stationary but axialy adjustable centering pin or axle for a worm gear which is connected to the pan for driving the same and/or for a hollow shaft through which this axle extends and which carries this worm gear and is nonrotatably connected or rigidly secured to the pan and is rotatably mounted on this axle which may also serve as a thrust bearing for the hollow shaft and the pan thereon. The upper end of this axle may also extend through the center of the upwardly curved central part of the annular pan and serve as an adjustable stop member for the upper housing part or cover. In addition to the axial adjustability of this spacing and centering axle relative to the upper housing part, the pan may also be adjustably secured to the upper end of the shaft so as to raise or lower it to different levels.

According to another feature of the invention, the upper rim of the lower housing part has a substantially L-shaped cross section, the rim of the pan has a substantially inverted U-shaped cross section so as to engage over the vertical arm of the L-shaped rim of the lower housing part, and the rim of the upper housing part when closed projects with the exception of the tunnellike part of its wall over the horizontal outwardly projecting part of the L-shaped rim and tightly engages therewith by a gasket.

Another feature of the invention consists in providiing a substantially flat section of the upper housing part or cover which is laterally spaced from the tunnel-like and hoodlike parts thereof with a transparent window through which the material in the pan may be observed when the cover is closed.

According to a further embodiment of the invention, the upper housing part is preferably divided substantially centrally into two parts which are pivotable independently of each other at one end of the lower housing part. The section of the upper housing part diametrically opposite to the section containing the tunnellike and hoodlike projections is provided with a large aperture, and the other upper housing part when pivoted downwardly covers and closes the aperture and forms a window of glass or transparent plastic through which the material in the pan may be observed. If the cutting and/or mixing operation may be carried out without evacuation or if during the cutting operation additional materials, for example, spices, are to be added, this windowlike cover may be pivoted upwardly, while the main upper housing part remains connected to the lower housing part and there is thus no danger that the operator of the machine may reach and be injured by the rotating cutter blades.

Figure 2:
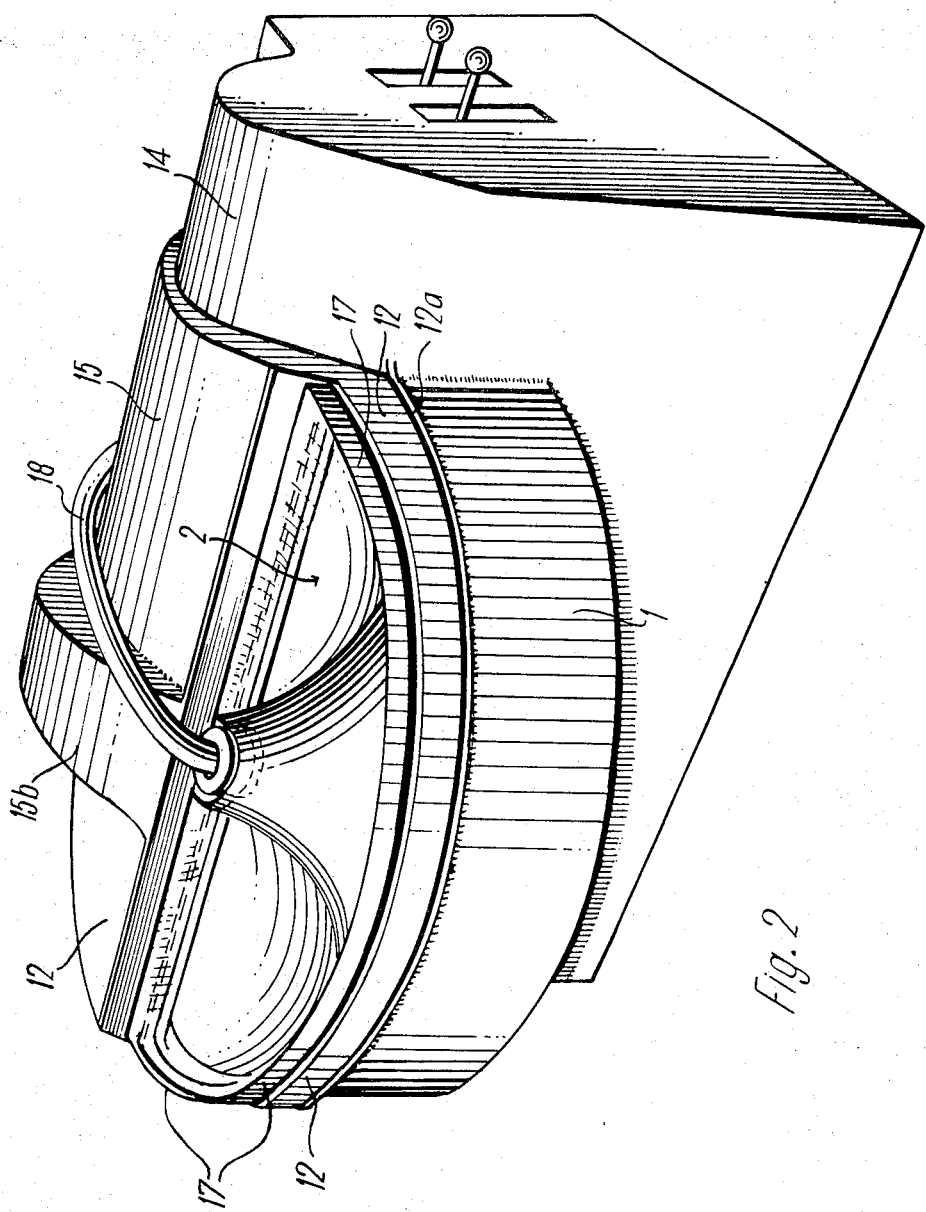

The features and advantages of the present invention will become further apparent from the following detailed description thereof which is to be read with reference to the accompanying diagrammatic drawings, in which FIG. 1 shows a cross section of a vacuum cutter according to the invention, while FIG. 2 shows a perspective front view of the same cutter, as seen in a direction substantially from the upper right side of FIG. 1.

As illustrated in the drawings and especially in FIG. 1, the vacuum cutter according to the invention comprises a housing which has a lower part 1 and an upper part 12 forming a cover for the lower part 1. For evacuating the space which is enclosed by these two parts 1 and 12 of the housing, the lower housing part 1 is provided with a nipple 1a which is connected by a conduit 1b to a suction pump 1c which is driven by a motor 7.

In the lower housing part 1 a pan 2 is mounted so as to be rotatable about a central vertical axis. This pan 2, as seen from above, has an annular shape and, as seen in a longitudinal section, its central part curves upwardly so as to terminate at the level of the upper surface of the outer rim 11 of the pan. This central part forms a hub with a central bore into which a vertical hollow shaft 3 is nonrotatably fitted which, in turn, is rotatably mounted on an axle 4 which is secured at its lower end to the lower housing part 1 and forms a centering member. The lower end of shaft 3 carries a worm gear 5 which meshes with a worm 6 the shaft of which is adapted to be driven by the motor 7 through a belt which also drives a horizontal blade or cutter shaft 8. This shaft 8 is totalably mounted in an upwardly projecting part 14 of the lower housing part 1 and the free end of shaft 8 which projects above and over the rim 11 of pan 2 carries a plurality of blades 9, only two of which are indicated in FIG. 1. For preventing any cleaning water or other undesirable matter from entering the machine, rim 11 of pan 2 has substantially an inverted U-shaped cross section and engages over a rib 10a which projects upwardly from the upper horizontal sealing rim 10 of the lower housing part 1. The upper housing part 12 is pivotably connected to the rear end wall of the lower housing part 1 by a hinge 13 which is adjustable by screws in the vertical direction relative to the sealing rim 10, and the lower edge of the upper housing part 12 is made of a shape complementary to that of the sealing rim 10 of the lower housing part 1 and carries a gasket 12a which is adapted to engage tightly upon the sealing rim 10. For manipulating the upper housing part 12 more easily, it may be provided with a counterweight or a relieving spring, not shown, or it may be raised from and/or lowered or even pressed upon the lower housing part 1 by hydraulic means. With the exception of the area around the projection 14, the upper housing part 12 extends over the rim 11 of pan 2 down to the upper sealing rim 10 of the lower housing part 1. Around the cutter shaft 8, however, the upper housing part 12 is provided with a tunnel-shaped projection 15 which terminates into a hoodlike enlargement forming a covering 15b over the rotary blades 9. At the front or operator's side of the machine, that is its right side in FIG. 1 and the front side in FIG. 2, the upper housing part 12 is substantially flat and provided with a window aperture 16 which may be covered and closed by a strong plate 17 of glass or a transparent plastic. This transparent cover plate 17 may be pivoted upwardly and downwardly independently of the upper housing part 12 and be locked in its closed position by a suitable lock, not shown. For this pivoting movement, the cover plate 17 is secured to one end of an arm 18, the other end of which is pivotably mounted on the rear end of the housing by the hinge 13 which therefore forms a double hinge since it also pivotably connects the upper housing part 12 to the lower part 1. As already mentioned, this hinge 13 is vertically adjustable by screws on the lower housing part 1. The arm 18 extends over the tunnellike projection 15 of the upper housing part 12 and therefore has a curving shape.

Since with the exception of the projecting parts 15 and 15b the upper housing part 12 forms a substantially flat cover which when closed will be spaced at only a small distance above the upper surface of the rim 11 of pan 2, the space above the material to be cut in the pan 2 has only a small volume and may therefore be quickly evacuated. Despite its considerable thickness, the wide transparent cover plate 17 when closed permits a continuous observation of the material in the pan 2 while rotating with the latter and being cut by the blades 9 or when the machine is stopped. Furthermore, after the cover plate 17 has been pivoted upwardly, the material may be easily filled into the pan 2 or after being cut, a sample thereof may be easily taken out of the pan or additional material, for example, spices, may be added or the pan may be partly or entirely emptied without requiring the entire upper housing part 12 to be pivoted upwardly. After the cover plate 17 has been closed, it will only require a short time to evacuate the relatively small space between the pan 2 and the material therein and the upper housing part 12 including the cover plate 17.

For accurately adjusting the upper and lower housing parts 12 and 17 and 1 relative to each other so as to close tightly, not only the hinge 13 of the upper housing parts 12 and 17 are vertically adjustable, but the centering axle 4 is also vertically adjustable by being adapted to be screwed for different distances into the rotatable shaft 3.

Furthermore, according to a preferred embodiment of the invention, the pan 2 may also be vertically adjustable so as to permit it to be readjusted when the upper housing part has been readjusted relative to the lower housing part 1. Such a vertical adjustment of the pan 2 may be effected, for example, by providing the hub of the pan with a central tapped bore and to insert an adjustable screw 27 therein for adjusting the pan in its axial direction and thus to different levels relative to the rotatable hollow shaft 3.

For further reducing the volume of the space which has to be evacuated underneath the pan 2, the housing of the worm gearing 5 and 6 is closed air-tight by a cover 21 and at least one gasket 22, while the space 23 around the hub of the pan is closed by a disk 24 relative to the space underneath the pan 2. Of course, this space 23 may also be filled out or the disk 24 may be integrally secured to the pan 2 and its hub.

Unless the worm gear 5 is tightly secured to the hollow shaft 3, it is advisable to provide the lower end of this shaft with a horizontal flange 25 which will then slide on a coating of oil on the bottom of the gear housing and take up the vertical pressure of the pan 2 and reduce any wobbling or tilting movements of the pan.

For emptying the pan 2, a suitable ejecting device of a known type and therefore not shown is mounted on the outside of the lower housing part 1. After the meat or other material has been cut in the pan 2 and the cover 17 of the upper housing part 12 has been pivoted upwardly, this ejecting device may be pivoted into the pan 2 and the material may then be removed from the pan mechanically in a known manner.

For cleaning the lower housing part 1, the bottom thereof is provided with removable, but tightly sealable plugs 19, and the bottom of pan 2 is also provided with one or more plugs 20 which when removed permit any liquid, especially cleaning water, to drain out of the pan and through the opened plugs 19 to the outside.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A vacuum cutter for cutting and/or mixing materials, for example, meat, comprising a housing having a lower stationary part and an upper cover part, hinge means for pivotably connecting said upper part at one end to said lower part for opening and hermetically closing said housing, a pan having an annular shape, as seen from above, a substantially vertical pan shaft rotatably mounted within said lower housing part and connected to the center of said pan for driving said pan within a substantially horizontal plane, the wall of said lower housing part with the exception of an upward projection at a small part of said wall having a substantially horizontal sealing rim slightly below the upper surface of the rim of said pan, a substantially horizontal cutter shaft rotatably mounted in a part of said machine laterally outside of said pan and extending from said side through said projection over the section of said pan which is located adjacent to said hinge means, at least one cutter blade mounted on the free end of said cutter shaft and rotatable within a substantially vertical plane through the space in said side of said pan and in the area above it, said upper housing part when closed likewise having a substantially horizontal sealing rim adapted to extend downwardly over the outer periphery of the rim of said pan and to engage hermetically with said sealing rim of said lower housing part, said upper housing part having a section of an upwardly projecting tunnellike shape extending substantially parallel to but laterally spaced from said hinge means and adapted to cover said cutter shaft and terminating into a further upwardly projecting hoodlike end forming a cover for said blades on the end of said cutter shaft, a gasket between said sealing rims including those on said projection and said tunnellike section of the wall of said upper housing part, said upper housing part when closed having a lower side which with the exception of said tunnellike and hoodlike sections thereof extends substantially horizontally and closely aboe the upper surface of the rim of said pan so as to leave a relatively small free space between said lower and upper housing parts and between the latter and said pan, suction means for evacuating said free space, and means for driving said pan and cutter shafts.

2. A vacuum cutter as defined in claim 1, in which said pan has a central hub projecting upwardly substantially to the level of the upper surface of the rim of said pan, said pan shaft being tubular and nonrotatably connected to said hub, and further comprising a vertical axle mounted on said lower housing part and extending axially through said pan shaft and its upper end forming a stop adapted to engage upon said upper housing part for limiting the downward movement thereof, said axle also forming a member for centering said tubular shaft and said pan.

3. A vacuum cutter as defined in claim 2, further comprising means for adjusting the position of said axle in its axial direction for varying the extent to which a substantially central point of said upper housing part may be lowered toward said lower housing part.

4. A vacuum cutter as defined in claim 1, in which a section of said upper housing part which is laterally spaced from said tunnellike and hoodlike projections forms a window through which, when said upper housing part is closed, the material in said pan may be observed.

5. A vacuum cutter as defined in claim 1, in which said upper housing part is divided into two cover members, a first of said cover members having at one side of its center said tunnellike and hoodlike projections and an aperture in its other side, the second cover member being pivotable to its open and closed positions independently of said first cover member and at least partly consisting of a transparent material through which, when both of said cover members are closed, the material in said pan may be observed through said aperture.

6. A vacuum cutter as defined in claim 1, further comprising means for adjusting said pan to different levels within said housing.

7. A vacuum cutter as defined in claim 1, further comprising removable closure means in the bottom of said pan and in said lower housing part to permit said pan to be drained and said lower housing part to be cleaned.

8. A vacuum cutter as defined in claim 1, in which, for reducing the space to be evacuated in said lower housing part, said lower housing is divided into at least an upper and a lower section, sealing means for hermetically sealing said sections relative to each other, said lower section comprising a gear housing having a cover, said pan shaft being rotatable within said gear housing and projecting upwardly through said cover to said pan, and gear means connected to said pan shaft within said gear housing.

9. A vacuum cutter as defined in claim 8, in which for further reducing the space to be evacuated, the space within said upwardly projecting hub of said pan is hermetically closed by a wall facing said cover of said gear housing.

10. A vacuum cutter as defined in claim 8, in which said gear means comprise a gear secured to the lower end of said pan shaft and rotatable on a bottom part of said gear housing forming a thrust bearing for said pan shaft.

11. A vacuum cutter as defined in claim 8, in which said pan shaft has an annular flange on its lower end within said gear housing, said gear means comprising a gear secured to said pan shaft on the upper side of said flange, said flange being rotatable on a bottom part of said gear housing forming a thrust bearing for said pan shaft.

* * * * *